(12) United States Patent
McGregor et al.

(10) Patent No.: US 12,465,517 B2
(45) Date of Patent: Nov. 11, 2025

(54) PATIENT WARMING SYSTEMS AND CORRESPONDING METHODS

(71) Applicant: Solventum Intellectual Properties Company, Maplewood, MN (US)

(72) Inventors: Andrew J. McGregor, West Lakeland, MN (US); James A. Thielen, Hugo, MN (US); Michael R. Berrigan, Oakdale, MN (US); Daniel P. Doran, Minneapolis, MN (US); Jenna L. Lindsay, Woodbury, MN (US); Amanda M. Rue, St. Paul, MN (US); Benjamin C. Stanaway, St. Paul, MN (US); John R. Stark, St. Paul, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 407 days.

(21) Appl. No.: 18/017,924

(22) PCT Filed: Jul. 21, 2021

(86) PCT No.: PCT/IB2021/056581
§ 371 (c)(1),
(2) Date: Jan. 25, 2023

(87) PCT Pub. No.: WO2022/029536
PCT Pub. Date: Feb. 10, 2022

(65) Prior Publication Data
US 2023/0270589 A1 Aug. 31, 2023

Related U.S. Application Data

(60) Provisional application No. 62/706,143, filed on Aug. 3, 2020.

(51) Int. Cl.
*A61F 7/00* (2006.01)
*A61F 7/02* (2006.01)

(52) U.S. Cl.
CPC .............. *A61F 7/0097* (2013.01); *A61F 7/02* (2013.01); *A61F 2007/0234* (2013.01); *A61F 2007/0257* (2013.01); *A61F 2007/0258* (2013.01)

(58) Field of Classification Search
CPC .. A61F 7/02; A61F 7/0097; A61F 2007/0234; A61F 2007/0257; A61F 2007/0258
See application file for complete search history.

(56) References Cited

U.S. PATENT DOCUMENTS 4,118,531 A 10/1978 Hauser
5,891,187 A 4/1999 Winthrop et al.
(Continued)

FOREIGN PATENT DOCUMENTS

WO 2001017470 A1 3/2001
WO 2006076148 A1 7/2006
(Continued)

OTHER PUBLICATIONS

International Search Report for PCT International Application No. PCT/IB2021/056581, mailed on Oct. 19, 2021, 2 pages.

*Primary Examiner* — Joseph A Stoklosa

(57) ABSTRACT

A clinical garment for patient warming including a front body panel having a first edge, an opposite second edge, an insulated sheet comprising an insulated layer positioned between an outer layer a film layer, a permeable layer adjacent to the film layer of the insulated sheet, a blanket section defined by a lower portion of the insulated sheet sealed to a lower portion of the permeable along a top edge, a bottom edge, and opposite first and second side edges of the blanket section, and at least one inlet port extending into the blanket section. The garment further includes a first back (Continued)

panel secured to at least a portion of the first edge of the front body panel and a second back panel secured to at least a portion of the second edge of the front body panel.

18 Claims, 10 Drawing Sheets

(56) References Cited

U.S. PATENT DOCUMENTS

| | | | |
|---|---|---|---|
| 7,226,454 B2 | 6/2007 | Albrecht et al. | |
| 7,819,911 B2 | 10/2010 | Anderson et al. | |
| 7,846,192 B2 | 12/2010 | Panser et al. | |
| 7,976,572 B2 | 7/2011 | Ziaimehr | |
| 8,192,475 B2 | 6/2012 | Anderson et al. | |
| 8,470,012 B2 | 6/2013 | Anderson et al. | |
| 9,642,404 B2 | 5/2017 | Giles et al. | |
| 2006/0122672 A1* | 6/2006 | Anderson | A61F 7/02 607/104 |
| 2017/0360598 A1 | 12/2017 | Mcgregor | |
| 2019/0104776 A1* | 4/2019 | Luoma | A41D 13/0053 |
| 2019/0110615 A1 | 4/2019 | Vergona et al. | |
| 2022/0354690 A1* | 11/2022 | McGregor | A61F 7/02 |
| 2024/0099934 A1* | 3/2024 | Stanfield | A41D 13/12 |

FOREIGN PATENT DOCUMENTS

| | | |
|---|---|---|
| WO | 2011049744 A2 | 4/2011 |
| WO | 2014180975 A1 | 11/2014 |
| WO | 2016105462 A1 | 6/2016 |
| WO | 2016105475 A1 | 6/2016 |
| WO | 2020261186 A1 | 12/2020 |
| WO | 2020261211 A1 | 12/2020 |
| WO | 2020261212 A1 | 12/2020 |

* cited by examiner

PATIENT WARMING SYSTEMS AND CORRESPONDING METHODS

CROSS REFERENCE TO RELATED APPLICATIONS

This application is a national stage filing under 35 U.S.C. 371 of PCT/IB2021/56581, filed Jul. 21, 2021, which claims the benefit of U.S. Provisional Application No. 62/706,143, filed Aug. 3, 2020, the disclosure of which is incorporated by reference in its/their entirety herein.

TECHNICAL FIELD

The present invention relates generally to patient warming devices and more particularly to thermal warming garments and blankets used for patient temperature management.

BACKGROUND

Pneumatic devices that transfer heat between thermally-conditioned air and a body are known. For example, there are inflatable pneumatic devices that receive a stream of pressurized, warmed air, inflate in response to the pressurized air, distribute the warmed air within a pneumatic structure, and emit the warmed air onto a body to accomplish such objectives as increasing patient comfort, reducing shivering, and treating or preventing hypothermia. These inflatable devices are typically characterized as "thermal blankets" or "thermal covers". Such inflatable devices are commercially available from the 3M Company of St. Paul, MN under the trade designation "Bair Hugger," for example.

Inflatable pneumatic warming blanket or cover devices are adapted especially for use with supine persons and are typically deployed by being placed directly on a person lying on a bed, a gurney, or a surgery platform, so as to drape over or cover some portion of the person. Because these devices are designed to cover and hang about or over a supine person, they are not easily or readily deployed on persons who are standing, sitting, reclining or moving. In particular, inflatable blankets are typically not suitable in a clinical setting in which it is desirable to warm a patient who must also be able to move about and between various postures. In addition, there are a variety of clinical settings in which patient warming is desirable, with each setting requiring its own unique access to patient anatomy that may not be possible when using an inflatable blanket. For example, examination or treatment of a patient in a post anesthesia care unit (PACU) could require access to patient lines in the chest area, setting IV's in the arm, application of a stethoscope to the back and/or side, or application of a blood pressure cuff, such that the use of an inflatable blanket may be inconvenient. Further, patient mobility can be adversely impacted if attempting to remain covered with an inflatable blanket when moving throughout a clinic, nursing home, or hospital. For example, transporting a patient to an x-ray or MRI location in a wheelchair may be more difficult when trying to keep a patient covered by an inflatable blanket.

Gowns including pneumatic convective devices have therefore been developed for a patient to wear to minimize some of the inconveniences discussed above relative to inflatable warming blankets. Such gowns can provide warmth to patients in various environments. For example, convective gowns can be used in a preoperative setting for comfort warming, such as before surgery and/or while waiting in a different room from the operating room. While many of such gowns are effective in providing the desired patient warming, there is a need to provide additional gown configurations to address varying patient requirements that can also be manufactured and assembled efficiently. It can also be advantageous to use such manufacturing and assembly techniques in the production of inflatable warming blankets.

SUMMARY

The clinical garments described herein are constructed from a front panel that can be manufactured from two input materials on an automated blanket line, each of which can include one or more sheets of layers, and two back panels with optional integrated sleeves that can be sewn on manually. The front panel has an insulated sheet, a permeable sheet, an inflatable blanket section and an optional pocket section for housing an forced air warming blanket. When included, the forced air warming blanket can be manually placed into the pocket and removed for use, as desired.

In an embodiment, a clinical garment is provided for patient warming including a front body panel that includes a first edge, an opposite second edge, an insulated sheet comprising an insulated layer positioned between an outer layer and a film layer, a permeable sheet adjacent to the film layer of the insulated sheet, a blanket section defined by a lower portion of the insulated sheet sealed to a lower portion of the permeable sheet along a top edge, a bottom edge, and opposite first and second side edges of the blanket section, and at least one inlet port extending into the blanket section. The garment further includes a first back panel secured to at least a portion of the first edge of the front body panel and a second back panel secured to at least a portion of the second edge of the front body panel. Patient warming using this garment can be provided by convection through the permeable sheet, wherein the permeable sheet may be an impermeable material through which a plurality of perforations extends.

The front body panel of the clinical garment may further include an upper pocket section defined by the top edge of the blanket section and a portion of the insulated sheet attached to a portion of the permeable sheet along a top edge of the upper pocket section, wherein the upper pocket section may include at least one pocket opening between the insulated sheet and the permeable sheet. The pocket opening(s) may include at least one side opening adjacent to at least one of the first and second edges of the front body panel and/or may include at least one top opening adjacent to the top edge of the upper pocket section and/or may include at least one bottom opening adjacent to the top edge of the blanket section. In an embodiment, an upper pocket section is defined by the top edge of the blanket section and a portion of the insulated sheet attached to a portion of the permeable sheet along a top edge of the upper pocket section, the upper pocket section comprising at least one pocket opening defined by an aperture created between the insulated sheet and the permeable sheet above the top edge of the blanket section. A forced air warming blanket may be removably positioned within the upper pocket section, which may be an upper body blanket, a lower body blanket, and underbody blanket, a full body blanket, a torso blanket, a surgical access blanket, or the like.

The clinical garment may also include a perimeter seal that seals the outer layer, the insulated layer, and the film layer of the insulated sheet to the permeable sheet along at least a portion of the top edge of the upper pocket section and along at least a portion of a bottom edge of the front panel, and that seals the insulated layer to the outer layer and the film layer along the first and second edges of the front body panel along at least a portion of the top edge of the upper pocket section and along at least a portion of the bottom edge of the front panel. In an embodiment, at least one of a first and a second side edge of the permeable sheet can be spaced at least slightly inwardly from at least one of a first and a second side edge of the insulated sheet, respectively. In an embodiment, the insulated sheet has a width defined by a distance between the first and second edges of the front body panel, wherein the permeable sheet has a width that is less than a width of the insulated sheet.

In an embodiment, a clinical garment is provided for use with a patient warming system, the garment including an inner surface, an outer surface, an upper pocket section defined by an insulated sheet sealed to a permeable sheet along at least a top pocket edge and a bottom pocket edge, and a lower warming section adjacent to the upper pocket section. The lower warming section is defined by the insulated sheet that is sealed to a permeable sheet to provide an inner area that is accessible by at least one port extending into the warming lower section. The insulated sheet comprises an insulated layer positioned between an outer layer and a film layer.

In an embodiment, a method is provided for making a front body panel for a clinical garment that includes the steps of: providing an insulated sheet comprising an insulated layer positioned between an outer layer and a film layer; providing a permeable sheet; positioning the film layer of the insulated sheet adjacent to an inner surface of the permeable sheet; cutting an outer peripheral shape of the front body panel from a combination of the insulated sheet and the permeable sheet; forming a lower blanket section of the clinical garment by sealing the permeable sheet to the insulated sheet along a seal pattern, wherein the lower blanket section comprises an inflatable air space between the permeable sheet and the insulated sheet and within the seal pattern; and sealing the outer peripheral shape of the front body panel.

With this method, the step of forming a lower blanket section may be performed simultaneously with the step of sealing the outer peripheral shape of the front body panel. In an embodiment, the step of cutting the outer peripheral shape of the front body panel may occur after at least one of the steps of forming the lower blanket section and sealing the outer peripheral shape of the front body panel. The insulated sheet may be wider than the permeable sheet, the insulated sheet can have a width that is generally the same as a width of the permeable sheet, or the permeable sheet can be wider than the insulated sheet. Further, the step of sealing the outer peripheral shape of the front body panel may include sealing the insulated sheet to the permeable sheet at a top edge and a bottom edge of the front body panel, and sealing the insulated layer, the outer layer, and the film layer of the insulated sheet together at a first side edge and a second side edge of the insulated sheet. The upper pocket section may be formed above the lower blanket section.

In an embodiment, a clinical blanket for patient warming is provided that includes an insulated sheet having an insulated layer positioned between an outer layer and a film layer and a permeable sheet adjacent to the film layer of the insulated sheet. The insulated sheet is sealed along a seal pattern to the permeable sheet to define an inflatable air space between portions of the insulated sheet and the permeable sheet. The blanket includes at least one inlet port extending into the inflatable air space.

In an embodiment, a clinical garment is provided for patient warming that includes a front body panel comprising a first edge, an opposite second edge, an insulated sheet comprising an insulated layer positioned between an outer layer and a film layer, a permeable sheet adjacent to the film layer of the insulated sheet, a blanket section defined by at least a portion of the insulated sheet sealed to a portion of the permeable sheet along a blanket perimeter, and at least one inlet port extending into the blanket section. The garment further includes a first back panel secured to at least a portion of the first edge of the front body panel and a second back panel secured to at least a portion of the second edge of the front body panel. With this embodiment, the blanket section may comprise the entire front body panel or a subsection of the front body panel. The garment may also include a pocket section adjacent to the blanket section, wherein the blanket section can be below the pocket section and/or above the pocket section, for example.

BRIEF DESCRIPTION OF THE DRAWINGS

The present invention will be further explained with reference to the appended Figures, wherein.

DETAILED DESCRIPTION

Figure 1:
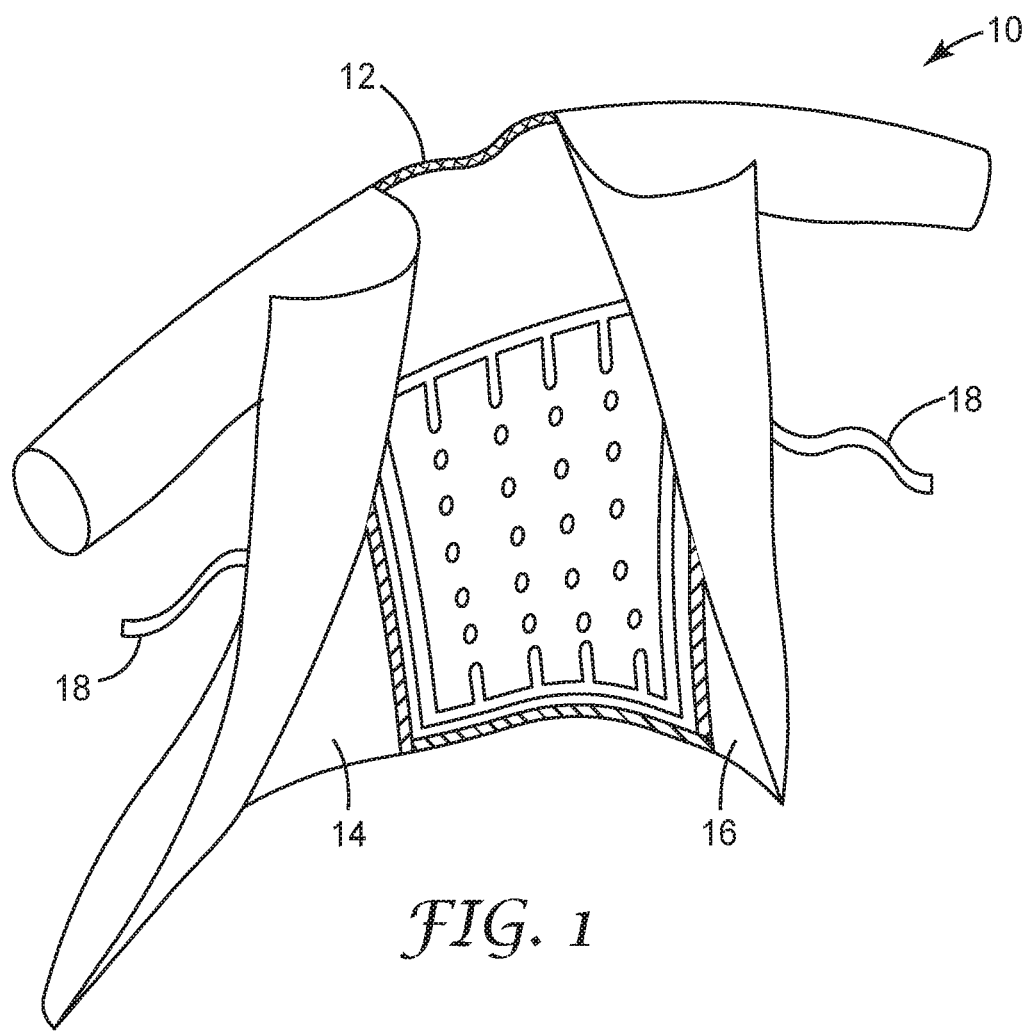
FIG. 1 is a perspective view of an embodiment of a clinical garment, showing a portion of the inside of the garment viewed from the back side.

Referring now to the Figures, and initially to FIG. 1, an embodiment of a clinical garment 10 is illustrated, which generally includes a front body panel 12, a first back panel 14, and a second back panel 16. Although the seams are not visible, the first back panel 14 is attached to one side edge of the front body panel 12 and the second back panel 16 is attached to an opposite side edge of the front body panel 12. In an embodiment, the front body panel 12 is manufactured using an automated material assembly process that attaches two layers of material to each other in a defined pattern. These materials can be provided in a roll form and/or as precut or preformed material sheets. The first and second back panels 14, 16, which can include integrated sleeve portions, will then be sewn onto the front body panel 12 using either a manual, automated, or semi-automated process. The garment 10 can also include features for keeping the garment secured to a patient, such as the illustrated ties 18, or other fastening features such as adhesive, microstructured mating surfaces, or the like Referring additionally to FIG. 2, a top view of the front body panel 12 is illustrated. Panel 12 generally includes an inflatable lower blanket section 20 and an upper pocket section 22 configured for housing at least one removable forced air warming blanket, such as an upper body blanket, a lower body blanket, and underbody blanket, a full body blanket, a torso blanket, and a surgical access blanket. The size of the lower blanket section 20 relative to overall size of the front body panel 12 can vary, but embodiments will include a lower blanket section having a surface area that is at least 40 percent of the area of the front body panel 12, but can be at least 50 percent, at least 60 percent, or even a larger percentage of the surface area of the front body panel. It is further contemplated that alternate embodiments will not include a pocket section but will instead include a warming area over all, some, or most of the surface area of a front body panel.

Front body panel 12 is a generally flat panel with an outer peripheral shape that includes a first edge 24 that is spaced across a width of the panel 12 from an opposite second edge 26, a top edge 28 that extends between the first and second edges 24, 26, and a bottom edge 30 that is spaced from the top edge 28 and extends between the first and second edges 24, 26. The top edge 28 can optionally include a recessed or cut-out neck portion 32, which can optionally be U-shaped, as shown. The distances between the edges of the front panel 12 can vary depending on the desired size of the clinical garment 10, wherein a garment that is sized for a larger patient will include larger distances between edges and a corresponding larger surface area than a garment that is sized for a smaller patient.

Figure 2:
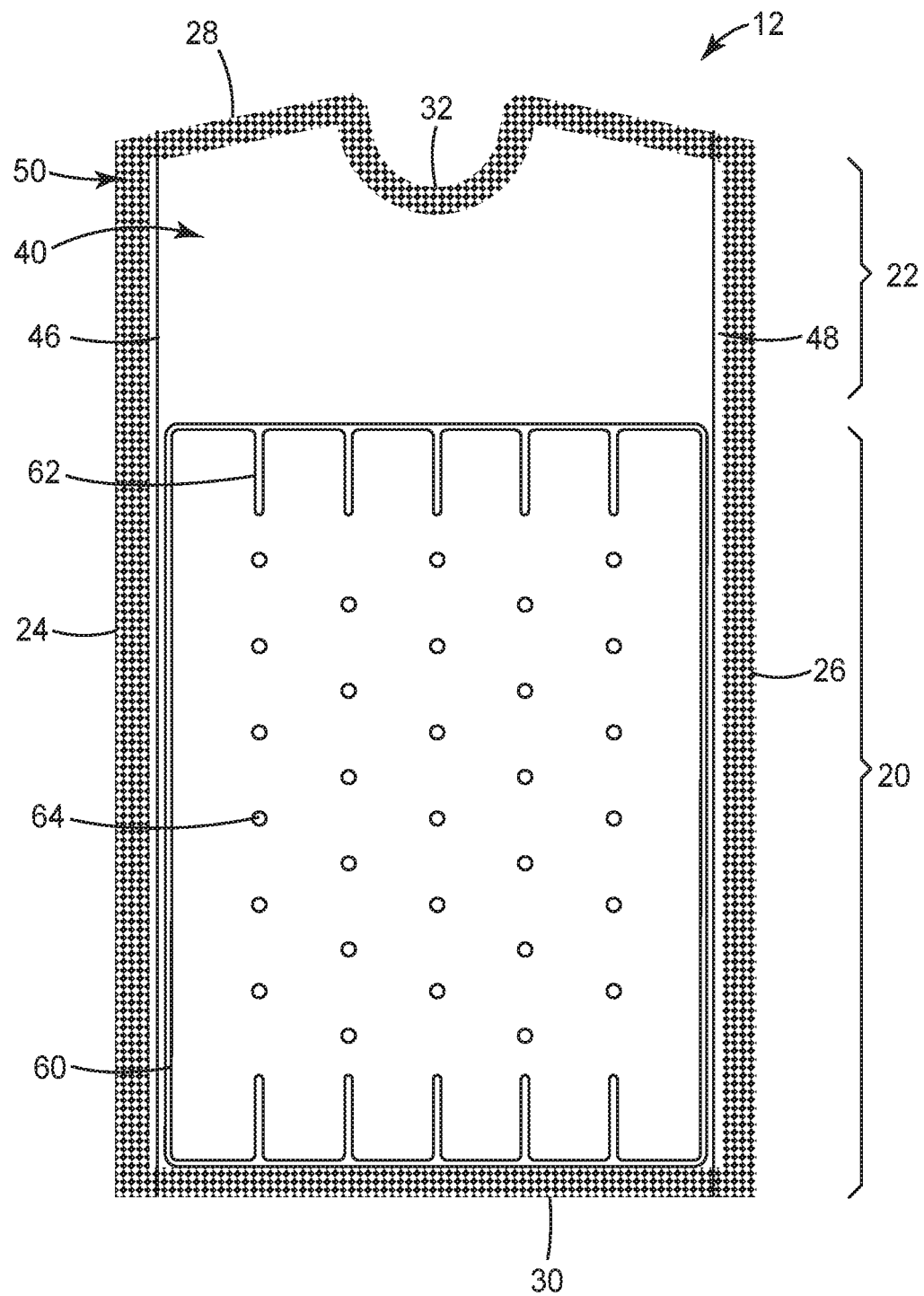
FIG. 2 is a top view of an embodiment of a front body panel of a clinical garment of the type illustrated in FIG. 1.
Figure 3A:
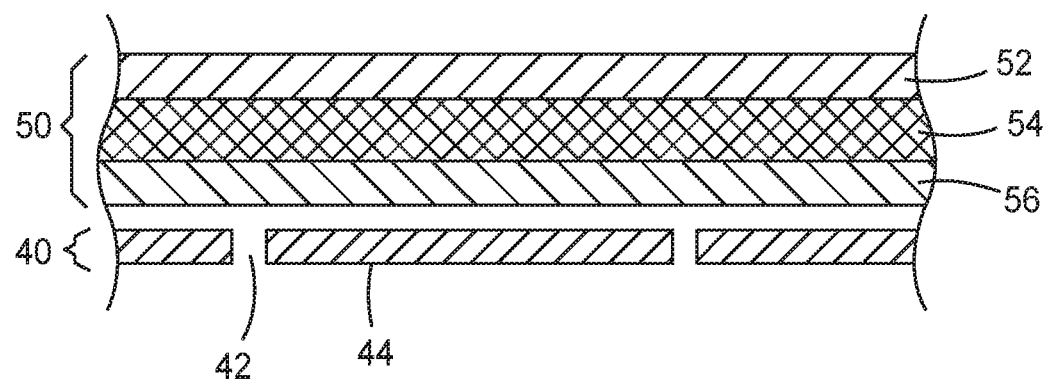
FIG. 3a is a cross-sectional view of a portion of a front body panel of a clinical garment of the type illustrated in FIGS. 1 and 2.

The front panel 12 is made up of two main layers or sheets that are shown generally in FIG. 2 and are also illustrated in cross-sectional side view detail in FIG. 3a. In accordance with this exemplary embodiment, the front body panel includes a first sheet or layer 40 and a second sheet or layer 50. First sheet or layer 40 is also referred to herein as a "permeable sheet" that is designed to be the inside surface of an assembled clinical garment 10, while second sheet or layer 50 is also referred to herein as an "insulated sheet" that is designed to be the outside surface of an assembled clinical garment 12.

Permeable sheet 40 is a material that can be coated on one or both sides so that it is impermeable except in the areas where perforations, holes, or apertures 42 extend through its thickness to provide the desired permeability to air, particularly pressurized air. Alternatively, the sheet 40 may be a membrane material or a membrane-type film that is air permeable without discrete perforations, holes, or apertures extending through it. When the front panel 12 is constructed, the sheets 40 and 50 form between themselves a pneumatic structure to receive and distribute pressurized air. At least one member of the device (the permeable sheet 40, for example) cooperates with the pneumatic structure to emit pressurized air from the device. In this regard, one end of an air hose may be received through an inlet port, and a stream of pressurized, thermally conditioned air introduced through the air hose will fill the space between sheets 40 and 50 and be distributed throughout the space. Pressurized air will be emitted from the pneumatic structure through the permeable sheet 40 and the motion of the emitted air supports heat transfer with a body adjacent, next to or near the pneumatic structure, facing the layer 40. The material chosen for the permeable sheet 40 can be chosen to be compatible with being against the patient's skin for comfort, yet impermeable to air, such as a 50 gsm coated material, for example.

When permeable sheet 40 includes perforations (e.g., perforations 42), they can be the same or different from each other across the surface of the layer. In general, the perforations can have a dimension, such as a diameter in examples having round shaped openings, and a spacing between the centers of the openings. In some examples, the openings are round in shape at the external surface of the permeable sheet 40. In other examples, the perforations can have a non-circular shape, such as elliptical shape, an oval shape, a shape having at least one straight side, an irregular shape, and the like. With any of the perforations, the shape may be symmetrical or non-symmetrical about an axis that extends generally through a center of the perforation. In some examples, the perforations can each have an area of about 0.48 mm$^2$ and in some examples can have an area in the range of about 0.20 to 0.80 mm$^2$. The spacing and the quantity of openings as provided across the layer 40 in some examples has a total perforation area of about 23.12 cm$^2$ and in some examples in a range of about 10 to 40 cm$^2$ over an inflated area for layer 40 enclosed within an area in the range of about 5,000 to 10,000 cm$^2$. The density of perforations can be higher or lower than these ranges.

Insulated sheet 50 is a combination material made up of a central insulating layer 54 positioned between an outer layer 52 and a film layer 56, which may be impermeable. Exemplary constructions and materials for these sub-layers 52, 54, and 56 of layer 50 are provided in the below paragraphs.

Outer layer 52 may be a non-woven material, which may include any one or more of polyester, cotton, rayon, polypropylene, and wood pulp. Layer 52 may be in the range of about 5-60 gsm.

Insulating layer 54 may be an insulated non-woven material layer, and can be formed from many appropriate materials or combinations of materials, including, but not limited to, foam, nonwoven and woven materials made from polymers such as polyester, polypropylene, polyethylene, polyethylene terephthalate, polyamides, polyvinyl chloride, acrylics, acrylic copolymers, polystyrene, rayons, acetates, and polysulfone. In a preferred embodiment, insulating layer 54 comprises a microfiber-based web made from polypropylene and polyester as described in U.S. Pat. No. 4,118,531 (Hauser) and commercially available from the 3M Company of St. Paul, Minnesota under the trade designation "Thinsulate." Some examples of suitable materials for use as the insulating layer 54 are 20-70 g/m$^2$ Thinsulate, C-type, 60-80 g/m$^2$ Thinsulate, G-type, 65 g/m$^2$ woven nylon, or 182 g/m$^2$ cotton blankets. In at least one embodiment, the insulating layer 54 can include one or more fabric scrims to contain a nonwoven material. In an example, the insulating layer 54 can have a thickness of no greater than 4 cm, no greater than 3 cm, no greater than 2 cm, or no greater than 1 cm as measured using ASTM D 5736 at 0.002 psi. In at least one embodiment, the insulating layer 54 can have a basis weight of between 20 g/m² to 200 g/m², and more preferably 40 g/m² to 100 g/m² to balance thermal comfort of the patient and pre-warming effect.

Film layer 56 can be a blown film made from suitable flexible polymer materials such as polyethylene, polyester, polypropylene (PP), high-density polyethylene (HDPE), polyethylene terephthalate (PET), polyamide (PA), or the like. The blown film is typically made from a homogeneous material. In some cases, layer 56 may be formed from a flexible, fibrous, preferably non-woven structure composed of polymeric materials capable of bonding to an upper side sheet of a heat-sealable polymeric material. For example, the layer 56 may be a non-woven, hydroentangled polyester material or a polyolefin such as a polypropylene film that is extrusion-coated, thermally laminated, or adhesively laminated onto a polyester layer. Alternatively, layer 56 may be a non-woven, paper-based material to which another layer, including either a polyethylene, polyester, or polypropylene film, has been glue laminated. In one embodiment, layer 56 can be made with a stratum of absorbent tissue paper prelaminated with a layer of heat-sealable plastic.

As shown, film layer 56 is adjacent to an inner surface of permeable sheet 40, with a slight air space 44 shown between them. This air space 44 is for illustration purposes to show that these layers are not attached to each other in areas where inflation occurs, as the layers 40, 56 will generally be in contact with each other except when the lower blanket section 20 is inflated.

Figure 3B:
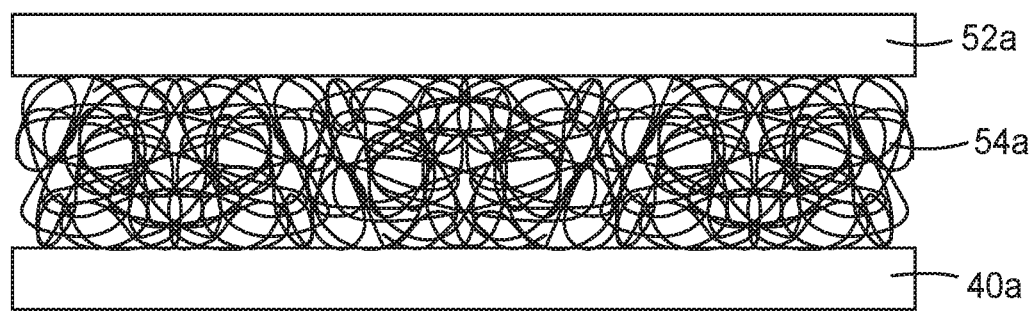
FIG. 3b is a cross-sectional view of a portion of another embodiment of a front body panel of a clinical garment of the type illustrated in FIGS. 1 and 2.

One alternative construction of front body panel 12 is illustrated in FIG. 3b as a three-layer construction. This embodiment includes a permeable sheet 40a that may be a perforated or membrane material layer, an insulating layer 54a, and an outer layer 52a. In such an embodiment, the outer layer 52a may be coated to make it impermeable. Other features of the multiple layers of body panel constructions described herein apply also to this configuration of a front body panel shown in FIG. 3b.

In the production of the two-layered front body panels 12, the material that makes up the permeable sheet 40 can be produced and supplied to a manufacturing line, and the three materials or sub-layers that make up the insulated sheet 50 can be made into a single roll of material that is also supplied to the same manufacturing line. Material from these two rolls can be secured to each other along the top edge 28 and the bottom edge 30 of body panel 12, and the multiple sub-layers of the insulated sheet 50 are sealed to each other along with the first and second side edges 24, 26. This sealing along the periphery of the body panel 12 can use the same or a different sealing technique as that used for a seal pattern 60 (discussed below) that defines the lower blanket section 20 to seal the sheets 40, 50 to each other within the outer periphery of the body panel 12. The outer peripheral shape of the front body panel 12 can then be cut. These steps can be performed in a variety of sequences, or at least two of the steps can be performed simultaneously.

Although the description above describes a manufacturing and assembly technique that involves providing multiple layers from rolls that are secured to each other as the material is unwound from their respective supply rolls and then cut into a desired shape, it is contemplated that the multiple pieces of the front body panel are instead provided as pre-cut pieces. These pieces can then be positioned adjacent to each other and sealed as described relative to front body panels made directly from rolls.

As shown in FIG. 2, lower blanket section 20 of the front body panel 12 is defined by sealing the permeable sheet 40 to insulated sheet 50 along a seal pattern 60 that is located within the peripheral seal of the front body panel 12. The sealing may be accomplished by a heating process and/or an ultrasonic process, for example. The illustrated seal pattern 60 includes an outer continuous peripheral seal that is generally rectangular with a series of flanges 62 spaced from each other and extending toward the center of the lower blanket section 20. Seal pattern 60 further includes a plurality of seal spots 64 spaced from each other and arranged in multiple rows that are offset from each other. The seal pattern 60 is only intended to be exemplary, as the configuration for the sealing of the layers to each other can vary slightly or considerably from the illustrated pattern. For example, the seal pattern may not include flanges, may include more, less, or differently positioned flanges, may not include seal spots, and/or may include more, less, or differently positioned seal spots. The flanges 62 also may be angled differently from each other and from what is illustrated, and may be longer or shorter than illustrated. In any of the arrangements, the seal pattern 60 is selected to provide a series of connected passageways that allow for even distribution of air within the lower blanket section 20 so that air can move uniformly from the permeable sheet 40 to warm the patient.

The outer peripheral portion of the seal pattern 60 seals the permeable sheet 40 to the insulated sheet 50 to provide the boundary of a cavity or enclosure that can accept air that is supplied to the lower blanket section 20. When inflated, the space 44 between the inner surface of permeable sheet 40 and the inner surface of layer 56 within the periphery of the seal portion can fill with air. The air can then exit the perforations 42 of the permeable sheet 40 for warming of the patient wearing the clinical garment 10.

The term "air" is used throughout the description as being supplied to embodiments of a clinical gown, blanket, and the like, wherein the supplied air can be conditioned air, including warmed air. When the air is warmed, it can be provided at a variable temperature that will provide adequate comfort and warming to a patient without being uncomfortably warm. In other embodiments, it is contemplated to supply cooled air or air at an ambient temperature, for example.

With continued reference to FIG. 2, the permeable sheet 40 includes opposite first and second edges 46, 48 spaced across its width. In an embodiment, the width of permeable sheet 40 is at least slightly smaller than the width of the insulated sheet 50. In this way, when a body panel peripheral seal is made around the outer periphery of the front body panel 12, permeable sheet 40 will be sealed to insulated sheet 50 only along the width of the permeable sheet 40 at the top edge 28 and bottom edge 30 of the front body panel 12. Because permeable sheet 40 does not extend to the first edge 24 and second edge 26 of the front body panel 12, the sealing process along those edges is provided only to seal the layers 52, 54, and 56 of insulated sheet 50 to each other. However, it is contemplated that the width of the permeable sheet 40 is the same as the width of the insulated sheet 50 or that the permeable sheet 40 is at least slightly larger than the width of the insulated sheet 50.

The peripheral seal of front body panel 12 may have a wide variety of configurations, wherein one exemplary seal includes a series of discrete seals that provide a relatively flexible seal arrangement that can be more comfortable when a patient's skin contacts the seal. In one example, the discrete seals are 3/16 inch high diamond-shaped seals. However, it is understood that the seal can instead have a different pattern of discrete shapes spaced from each other, may include a continuous seal without spaces, and/or any other seal configurations that provide for the desired attachment of layers to each other.

Figure 4:
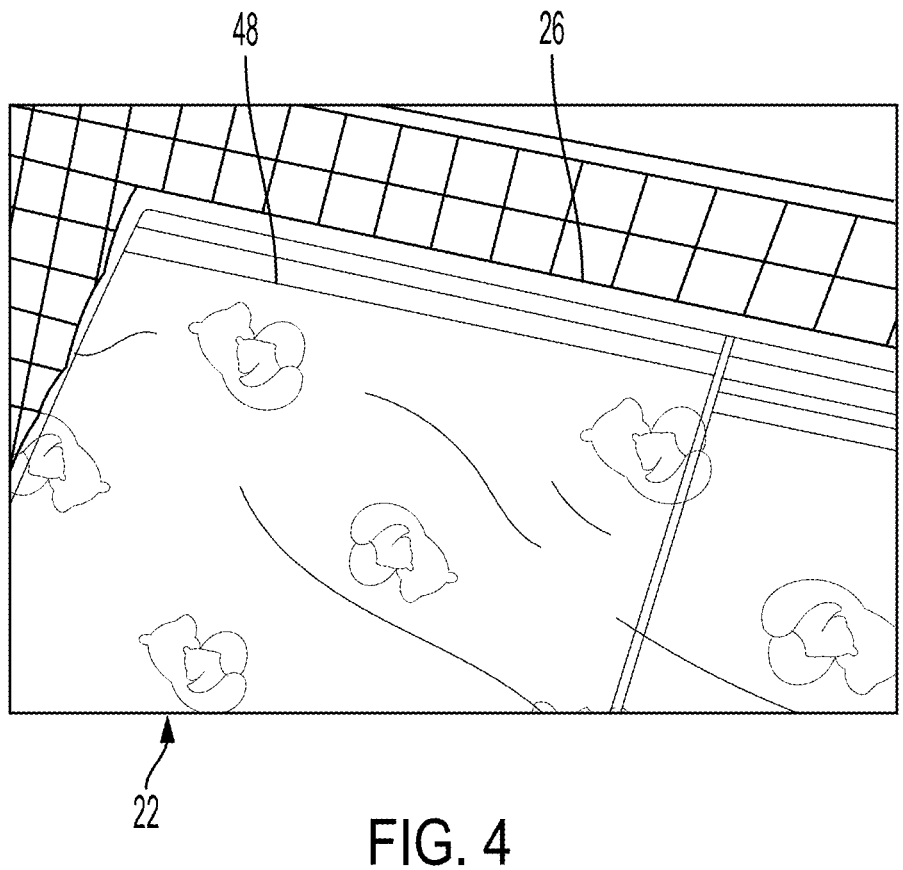
FIG. 4 is an enlarged top view of a portion of a top pocket area of a clinical garment.
Figure 5:
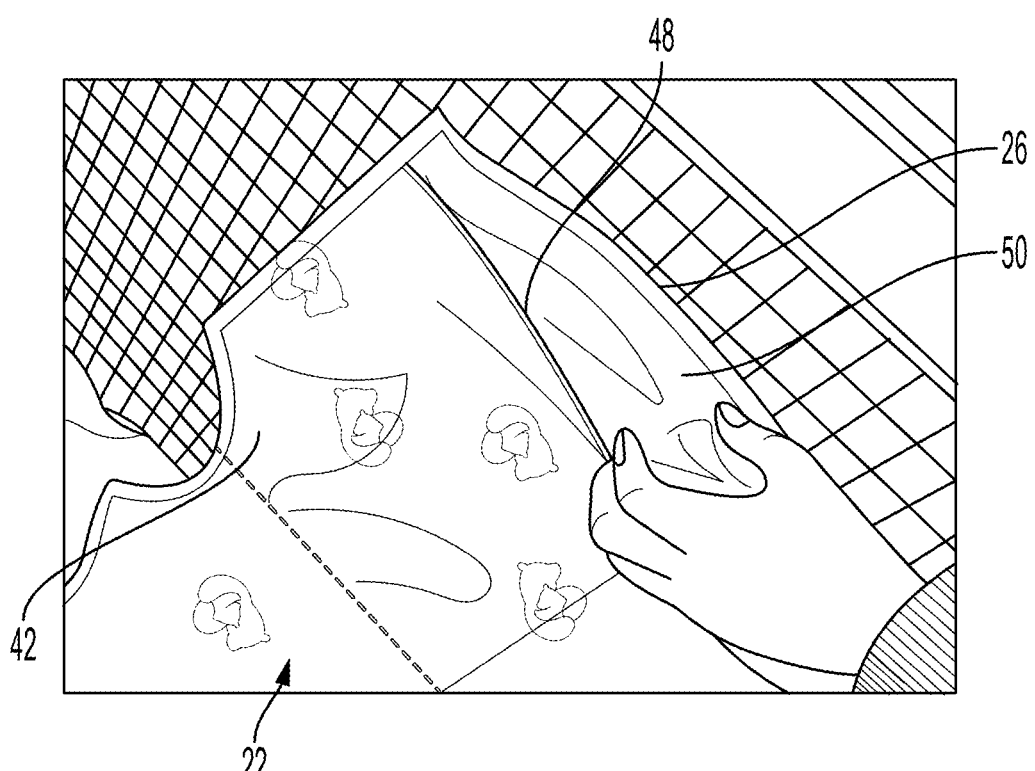
FIG. 5 is another enlarged top view of a portion of the top pocket area of the clinical garment illustrated in FIG. 4, with the pocket being held in a partially open configuration.
Figure 6:
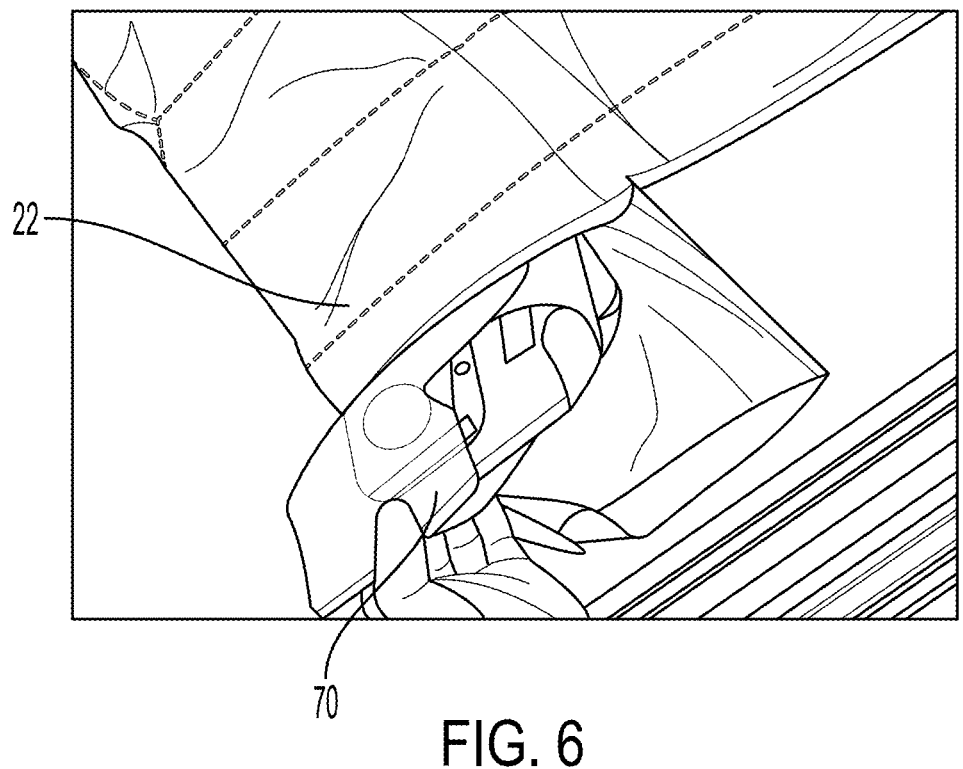
FIG. 6 is a top view of a top pocket portion of a clinical garment from which an upper body blanket is partially extending.

Because the first and second edges 46, 48 of permeable sheet 40 are not sealed to the insulated sheet 50 at first and second edges 24, 26 of the insulated sheet 50, these edges provide for an opening into the upper pocket section 22. The periphery of the upper pocket section 22 is therefore defined by the sealed top edge 28, first and second edges 46, 48 of permeable sheet 40 above the lower blanket section 20, and the top edge of the lower blanket section 20. Enlarged views of pocket section 22 are illustrated in FIGS. 4-6, wherein FIG. 4 shows pocket 22 in a closed configuration, and FIG. 5 shows pocket 22 being opened by pulling the permeable sheet 40 away from insulated sheet 50 in the area of the second edge 26 of front body panel 12 and second edge 48 of permeable sheet 40. In an alternative embodiment, the upper pocket section includes an opening at or near the top edge 28 instead of or in addition to at one or both sides of the upper pocket section. In yet another alternative embodiment, the upper pocket section includes an opening at or near the top edge of the lower blanket section instead of or in addition to at one or both sides of the upper pocket section.

FIG. 6 illustrates an upper body blanket 70 partially extending from one side of the upper pocket section 22. Upper body blanket 70 can be a pneumatic convective device, such as an upper body blanket commercially available from the 3M Company of St. Paul, MN as the Bair Hugger Model 622. Such an upper body blanket may optionally be folded prior to insertion into the upper pocket section 22, and may further optionally be in a sealed package. As previously discussed, this pocket can include any kind of forced air warming blanket instead of or in addition to an upper body blanket, such as a lower body blanket, and underbody blanket, a full body blanket, a torso blanket, and a surgical access blanket.

By sealing the edges of the insulated sheet 50 as described above, linting can be reduced. The term "linting," as used herein, refers to the release of particles from layers that are not sealed to prevent such a release. Linting can be measured using a Gelbo-flex linting test to measure airborne particles shaken from a fabric per cubic foot of air. The standard protocol for linting testing is ASTM 160.1. Particles are typically measured from 0.5 microns or larger in size. As defined herein, non-linting can generally refer to warming devices with treated or sealed insulative edge portions having Gelboflex particle counts of less than 20,000, less than 10,000, less than 5,000, less than 2,500, less than 1,000, or less than 500. In at least one embodiment, the standard for testing can be ISO 9073-10 (2003). Under this testing standard, non-linting can also refer to the coefficient of linting being no greater than 4.5, or no greater than 4.4, no greater than 4.3, no greater than 4.2, no greater than 4.1, no greater than 4, no greater than 3.9, no greater than 3.8, no greater than 3.7, no greater than 3.6, or no greater than 3.5. With regard to the embodiment of FIG. 2, for example, the peripheral edges of the front body panel 12 can be sealed or encapsulated using a variety of techniques to prevent the edges from linting. For example, the peripheral edges 24, 26, 28, and 30 can include the peripheral seal patterns described above and/or can be flame laminated, coated, heated, sintered, sewn, taped, or combinations thereof.

Figure 7:
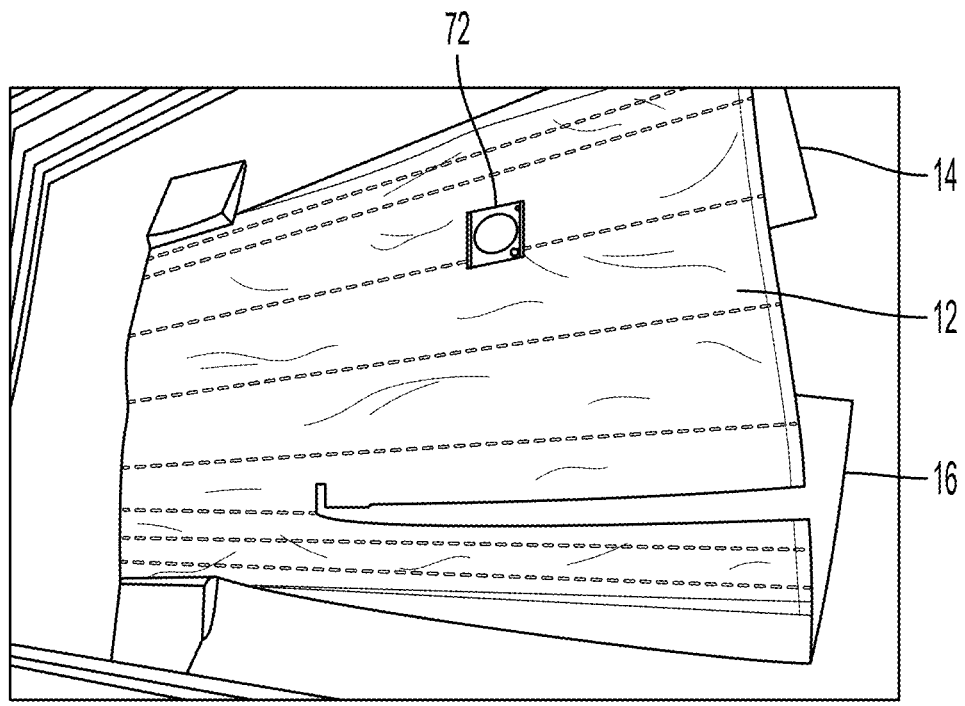
FIG. 7 is a top front view of an embodiment of a clinical garment assembled with a front panel and two back panels.
Figure 8:
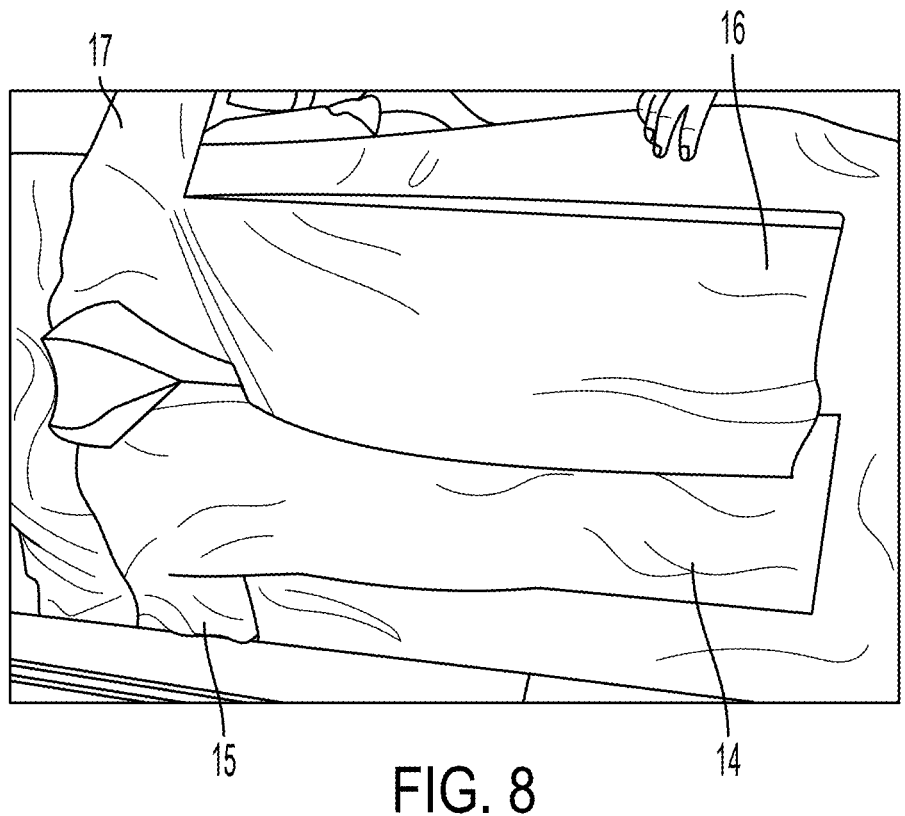
FIG. 8 is a top back view of the clinical garment of FIG. 7, with the back panels in a closed position.

FIGS. 7 and 8 illustrate the clinical garment 10 with the first back panel 14 attached to one edge of the front body panel 12 and the second back panel 16 attached to the opposite edge of the front body panel 12. First back panel 14 includes an integrated arm portion 15 and second back panel 16 includes an integrated arm portion 17. The back panels 14, 16 can be attached to the front body panel 12 by sewing along the sides of the lower warming section, although it is possible that they are instead attached using two-sided adhesive, hook and loop materials (including microstructured interlocking materials), snaps, heat, ultrasonic means, rivets, combinations thereof, and/or the like. Attachment of the back panels 14, 16 in the area of the upper pocket section 22 may be accomplished using an adhesive, particularly in cases where it is difficult to access the attachment area with a sewing machine, or can also be accomplished by hand-sewing. Any combination of these or other attachment techniques can be used for various areas of the clinical garment 10.

As shown in FIG. 7, the front body panel 12 includes a port 72 into which air can be supplied to the inflatable lower blanket section 20. In particular, the port 72 extends through the layers 52, 54, and 56 of insulated sheet 50 and into the space 44 between permeable sheet 40 and insulated sheet 50. In operation, a patient inserts their arms into the arm portions 15, 17 of the clinical garment 12 with the front body panel 12 positioned on the front part of the patient's body. The first and second back panels 14, 16 are wrapped around the back of the patient and tied or otherwise secured to the patient. One end of an air hose can then be connected to the port 72, while the other end of the air hose is connected to a warming unit. The warming unit provides a stream of pressurized, thermally treated air that is directed into the space 44 to at least partially inflate the lower blanket section 20. Warming units that can be used for this application include those of the type commercially available from the 3M Company of St. Paul, MN as the Bair Hugger Model 675, the Bair Hugger Model 775, or the Bair Hugger Model 875.

The temperature of air prior to entering the lower blanket section 20 may range from ambient to up to approximately 46° C. The average air temperature delivered to the patient may be less than this, depending on the garment design. The airflow prior to the air entering the lower blanket section 20 may be between in the range of about 5-70 CFM. In at least one embodiment, the airflow can be at least 20 CFM, at least 30 CFM, or at least 40 CFM. The pressure inside the lower blanket section 20 may range from approximately 0.05 to 1.2 inches H$_2$O, for example. The warming unit may be mounted on an IV pole, particularly in situations where the patient needs to be mobile while wearing the clinical garment 10.

When the stream of pressurized, thermally treated air is provided to lower blanket section 20, the lower blanket section 20 at least partially inflates such that air is emitted through the perforations in the permeable sheet 40 under pressure, thereby providing the patient with thermally controlled air at a desired temperature and flow rate. In an embodiment, the clinical garment 10 is worn so that the perforations 42 of permeable sheet 40 face the patient primarily in the region between the person's neck and thighs. Thus, when pressurized, thermally treated air is provided to the lower blanket section 20, which is distributed and then emitted through the perforations 42 in the patient's central core or trunk area. Convection will then cause heat transfer between the emitted, thermally treated air and the person's body core or diminish heat loss from the person's body to the environment.

Figure 9:
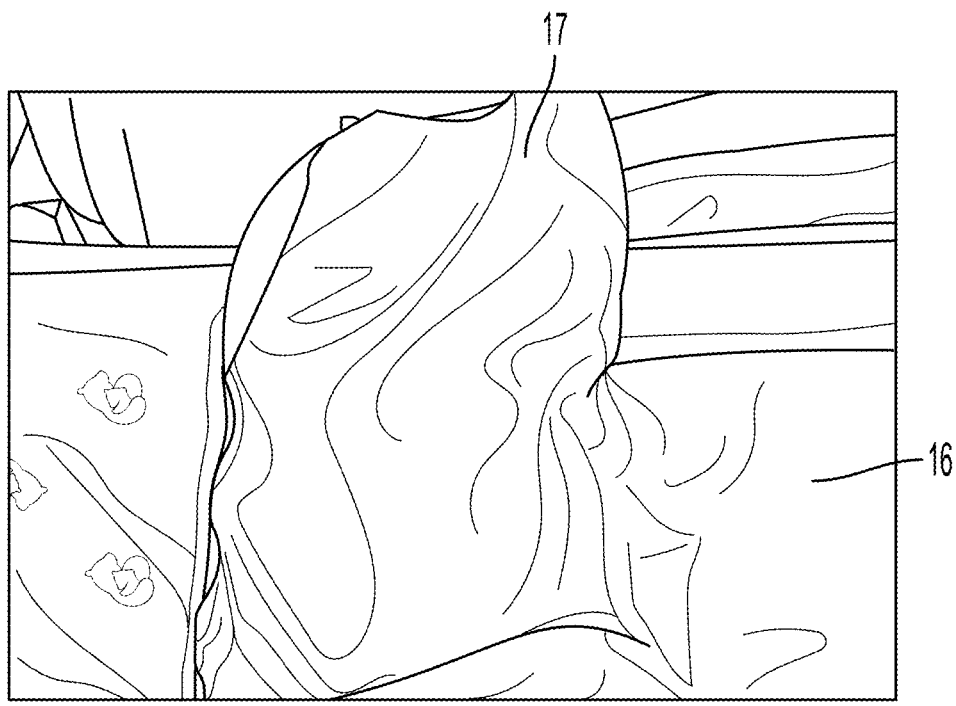
FIG. 9 is an enlarged view of one of the sleeve areas of an embodiment of a clinical garment.
Figure 10:
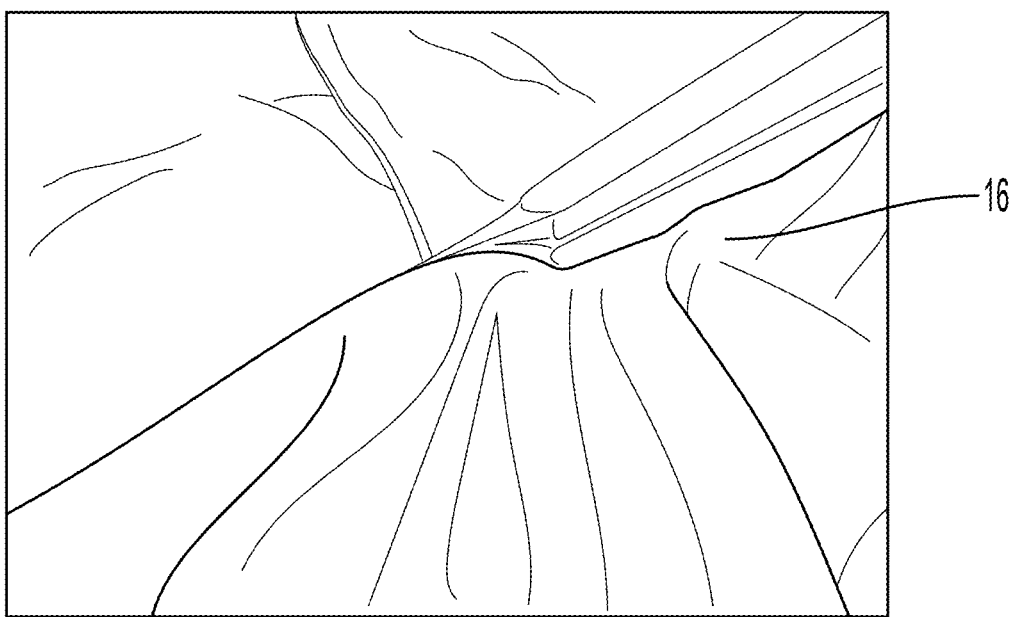
FIG. 10 is an enlarged view of an attachment area between a front panel and a back panel of a clinical garment.
Figure 11:
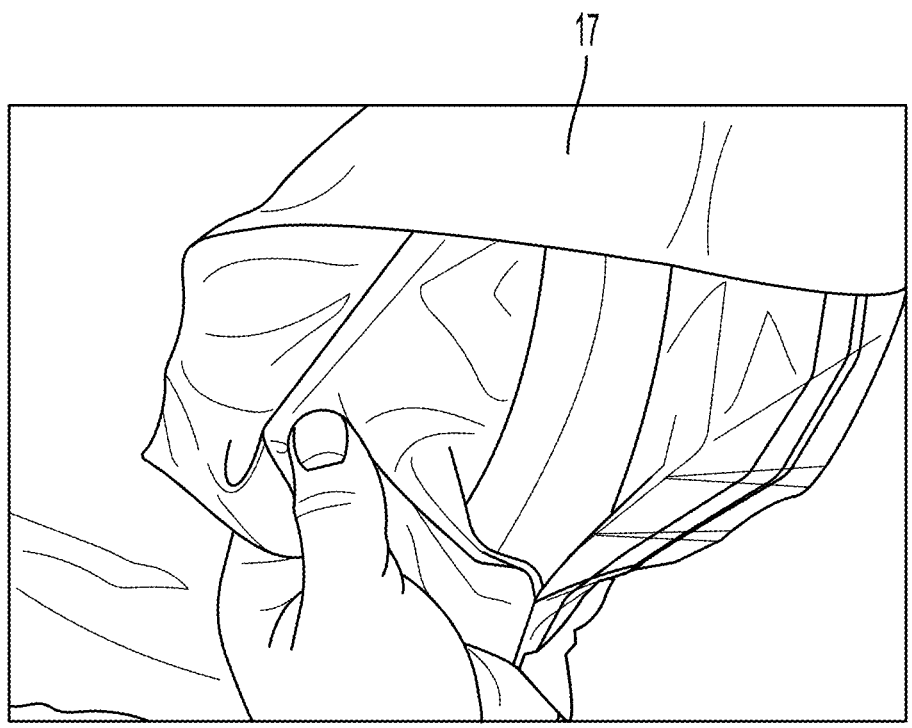
FIG. 11 is an enlarged view of an embodiment of a pocket opening of a clinical garment, illustrating an adhesive attachment between one of the layers of the front panel and one of the back panels.

With continued reference to FIGS. 7 and 8, and additionally to FIGS. 9-11, the integrated arm portions 15 and 17 of first and second back panels 14, 16, respectively (with arm portion 17 of second back panel being shown enlarged in FIGS. 9-11), are attachable to the front panel 12 with an attachment method such as double-sided adhesive (which is best shown in FIG. 11). With such a process, the sleeves do not need to be sewn on with a separate process. Although the body portion of the first and second back panels 14, 16 are sewn and/or otherwise attached to the side edges of the front body panel 12, as is discussed above, throughput for assembling these clinical garments 10 is improved by eliminating the need to also sew separate sleeves onto the garments.

Figure 12:
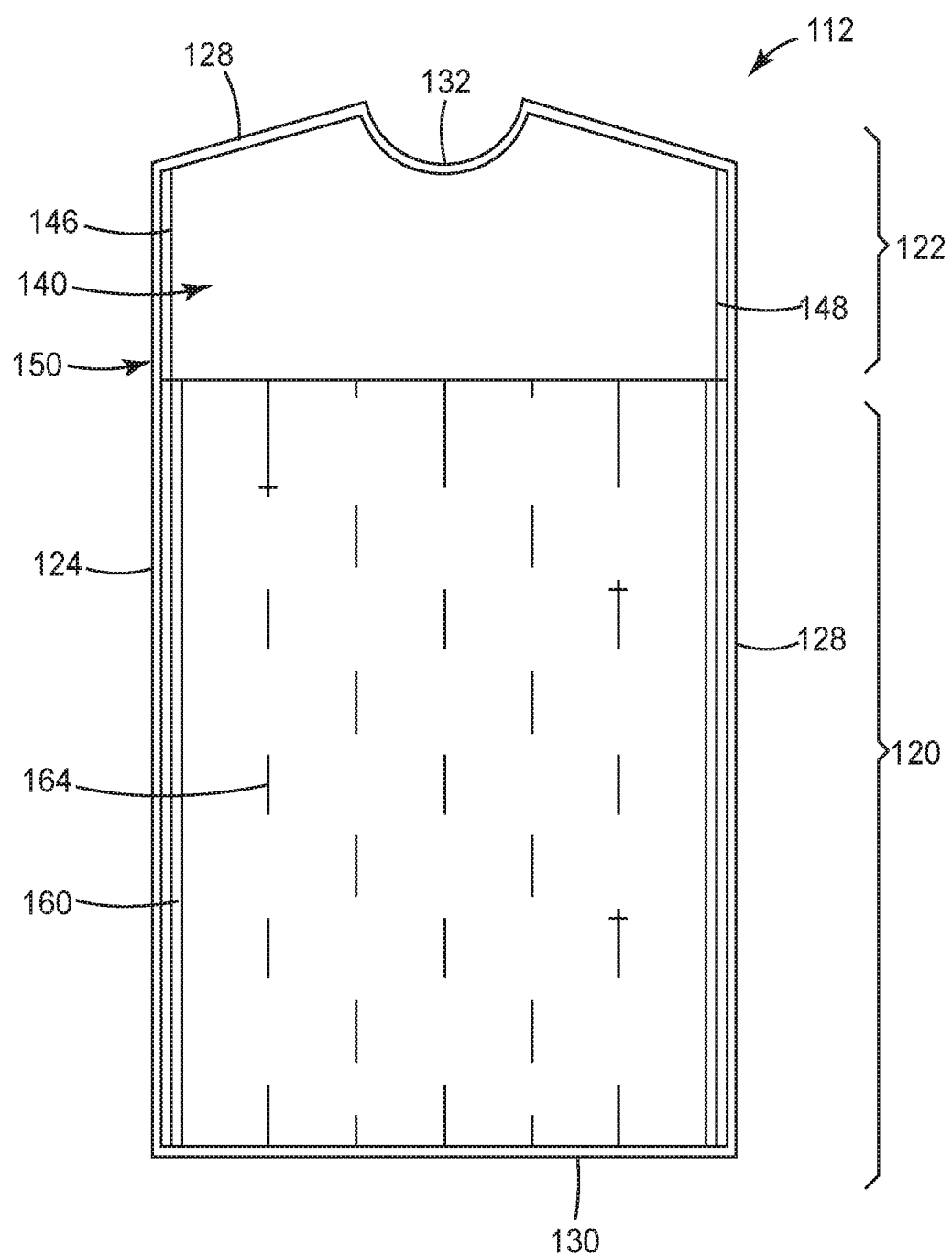
FIG. 12 is a top view of an embodiment of a front body panel of a clinical garment.

While the above discussion describes an embodiment of a front body panel and variations thereof, a wide variety of additional configurations for the front body panel are contemplated, which can include different patterns for the seal that defines the lower blanket section, different shapes for the overall perimeter of the front body panel, and other variations. One of such alternate embodiments for a front body panel 112 is illustrated in FIG. 12. As shown, front body panel 112 generally includes an inflatable lower blanket section 120 and an upper pocket section 122 configured for housing a removable forced air warming blanket. The size of the lower blanket section 120 relative to overall size of the front body panel 112 can vary, but embodiments will include a lower blanket section having a surface area that is at least 40 percent of the area of the front body panel 112, but can be at least 50 percent, at least 60 percent, or even a larger percentage of the surface area of the front body panel. It is further contemplated that alternate embodiments will not include a pocket section but will instead include a warming area over all or most of the surface area of a front body panel.

Front body panel 112 is a generally flat panel with an outer peripheral shape that includes a first edge 124 that is spaced across a width of the panel 112 from an opposite second edge 126, a top edge 128 that extends between the first and second edges 124, 126, and a bottom edge 130 that also extends between the first and second edges 124, 126. The top edge 128 can optionally include a U-shaped neck portion 132, as shown. The distances between the edges of the front panel 112 can vary depending on the desired size of the clinical garment in which it will be used.

The front panel 112 is made up of two main layers that are shown generally in FIG. 12 and are similar to those illustrated in FIG. 2 and in cross-sectional side view detail in FIG. 3a. In accordance with this exemplary embodiment, the front body panel includes a permeable sheet 140 and an insulated sheet 150. Permeable sheet 140 is also referred to herein as an "inner layer," as it is designed to be the inside surface of an assembled clinical garment, while insulated sheet 150 is also referred to herein as an "outer layer," as it is designed to be the outside surface of an assembled clinical garment.

Inner layer 140 is a material that can be coated on one or both sides so that it is impermeable except in the areas where perforations, holes, or apertures extend through its thickness. Alternatively, the layer 140 may be a membrane material or a membrane-type film that is air permeable without specific perforations extending through it. When the front panel 112 is constructed, the layers 140 and 150 form between themselves a pneumatic structure to receive and distribute pressurized air. At least one member of the device (the layer 140, for example) cooperates with the pneumatic structure to emit pressurized air from the device. In this regard, one end of an air hose may be received through an inlet port, and a stream of pressurized, thermally conditioned air introduced through the air hose will fill the space between layers 140 and 150 and be distributed throughout the space. Pressurized air will emitted from the pneumatic structure through the layer 140 and the motion of the emitted air supports heat transfer with a body adjacent, next to or near the pneumatic structure, facing the layer 140. The material chosen for the layer 140 can be chosen to be compatible with being against the patient's skin for comfort, yet impermeable to air, such as a 50 gsm coated material, for example. Layer 150 is a combination material made up of a central insulating layer positioned between an outer layer and a film layer, which may be impermeable.

As with the embodiment described relative to FIGS. 2 and 3, a film layer of layer 150 is adjacent to an inner surface of layer 140. These layers will generally be in contact with each other except when the lower blanket section 120 is inflated.

In the production of the two-layered front body panels 112, the material that makes up the layer 140 can be produced and supplied to a manufacturing line, and the multiple materials or sub-layers that make up the layer 150 can be made into a single roll of material that is also supplied to the same manufacturing line. Material from these two rolls can be secured to each other along the top edge 128 and the bottom edge 130, and the multiple sub-layers of the layer 150 are sealed to each other along with the first and second side edges 124, 126. This sealing along the periphery of the body panel 112 can use the same or a different sealing technique as that used for a seal pattern 160 (discussed below) that defines the lower blanket section 120 to seal the layers 140, 150 to each other within the outer periphery of the body panel 112. The outer peripheral shape of the front body panel 112 can then be cut. These steps can be performed in a variety of sequences, or at least two of the steps can be performed simultaneously.

Although the description above describes a manufacturing and assembly technique that involves providing multiple layers from rolls that are secured to each other as the material is unwound from their respective supply rolls and then cut into a desired shape, it is contemplated that the multiple pieces of the front body panel are instead provided as pre-cut pieces. These pieces can then be positioned adjacent to each other and sealed as described relative to front body panels made directly from rolls.

As shown in FIG. 12, lower blanket section 120 is defined by sealing the layer 140 to the layer 150 along a seal pattern 160. The sealing may be accomplished by a heating process or an ultrasonic process, for example. The illustrated seal pattern 160 includes an outer continuous peripheral seal and a plurality of seal bands 164 spaced from each other and arranged in multiple rows that are offset from each other. The seal pattern 160 is only intended to be exemplary, as the configuration for the sealing of the layers to each other can vary slightly or considerably from the illustrated pattern. In any of the arrangements, the seal pattern 160 is designed to allow for even distribution of air within the lower blanket section 120 such that air can move uniformly from the layer 140 to warm the patient. In any of the arrangements, the seal pattern 160 is selected to provide a series of connected passageways that allow for even distribution of air within the lower blanket section 120 such that air can move uniformly from the layer 140 to warm the patient.

The outer peripheral portion of the seal pattern 160 seals the layer 140 to the layer 150 to provide the boundary of a cavity or enclosure that can accept air that is supplied to the lower blanket section 120. When inflated, the space between the inner surface of layer 140 and the inner surface of layer 50 within the periphery of the seal portion can fill with air. The supplied air can then exit the perforations of the layer 140 for warming of the patient wearing the clinical garment.

With continued reference to FIG. 12, the layer 140 includes opposite first and second edges 146, 418 spaced across its width. The width of layer 140 is at least slightly smaller than the width of the layer 150. In this way, when a body panel peripheral seal is made around the outer periphery of the front body panel 112, layer 140 will be sealed to layer 150 only along the width of the layer 140 at the top edge 128 and bottom edge 130 of the front body panel 112. Because layer 140 does not extend to the first edge 124 and second edge 126 of the front body panel 112, the sealing process along those edges is provided only to seal the multiple sub-layers of layer 150 to each other. However, it is contemplated that the width of the layer 140 is the same as the width of the layer 150 or that the layer 140 is at least slightly larger than the width of the layer 150.

Because the first and second edges 146, 148 of layer 140 are not sealed to the layer 150 at first and second edges 124, 126 of the layer 150, these edges provide for an opening into the upper pocket section 122. The periphery of the upper pocket section 122 is therefore defined by the sealed top edge 128, first and second edges 146, 148 of layer 140 above the lower blanket section 120, and the top edge of the lower blanket section 120.

The front panels described herein may be incorporated into a variety of clinical garments that are the same or different from those discussed, including a standard gown, a modified gown or a special purpose gown. The gowns may have rear openings, front openings or other openings suitable openings, such as a head opening in a poncho type gown.

In the above embodiments, the multiple layers of the front body panel are described as having a different width that allows for the creation of a pocket section in the unsealed edge area above the lower blanket section. However, it is also contemplated that these layers are the same width, wherein the layers would be attached to each other around the entire periphery of the front body panel. In this case, openings to an upper pocket section would be created by cutting or otherwise separating the first and second layers at one or both edges of the front body panel.

The layers discussed herein relative to the front body panels can also be configured for use as patient warming blankets. In such a configuration a first blanket layer includes a perforated material and a second layer includes an insulated layer positioned between an outer layer and a film layer, as described above relative to the layers of a front body panel. An air space between the layers allows for inflation of the blanket and flow of air through the perforated material to warm a patient.

Figure 13:
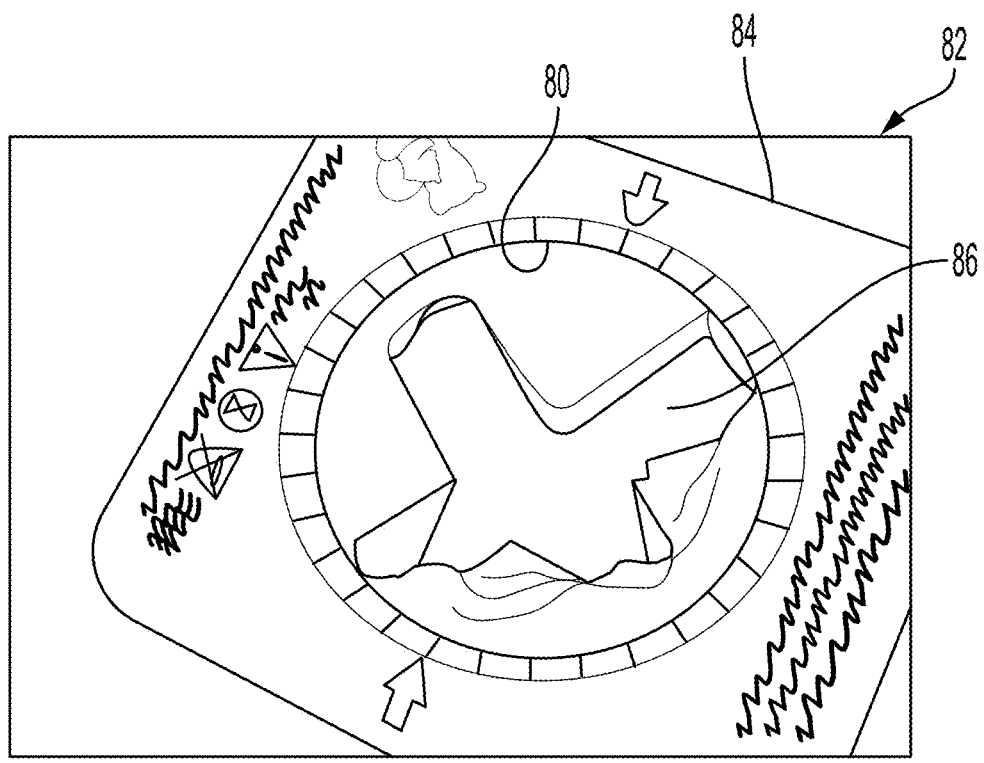
FIG. 13 is a top view of a hose card with a hose access port through which air can enter a clinical garment.

FIG. 13 is a top view of a hose access port 80 of a hose card 82 through which air can be supplied to a clinical garment, such as the clinical garment 10 described herein, for example. A flat portion 84 of hose card 82 can be adhered or otherwise attached to a surface of the front body panel of a clinical garment or a blanket into which conditioned air will be supplied. The layer through which the access port 80 extends can be flattened in the area of the hose card 82 to compress it, which can reduce fiber migration when insulative materials and/or materials with loose fibers are used for the garment or blanket. Heat and/or pressure can be used in this flattening process, if desired. Alternatively or additionally, tape or another material can be attached to an outer surface of the layer to which the hose card is attached to reduce fiber migration. In any of these configurations, one or more cuts can be made within the port 80 through the layer of the garment to which the flat portion 84 of the hose card 82 is attached, such as the X-shaped cut 86 shown in FIG. 13.

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

What is claimed is:

1. An assembly, comprising:
   a clinical garment; and
   a front body panel secured to the clinical garment, wherein the front body panel comprises:
     an insulated sheet comprising an outer layer, a film layer, and an insulated layer positioned between the outer layer and the film layer; and
     a permeable sheet adjacent to the film layer of the insulated sheet to define a cavity therebetween;
   wherein the insulated sheet and the permeable sheet are selectively sealed together to define:
     a pocket section defining at least one pocket opening to receive an accessory; and
     a blanket section providing at least one inlet port in fluidic communication with the cavity, wherein the blanket section is configured to provide warming to a patient based on the cavity receiving warmed air via the at least one inlet port.

2. The assembly of claim 1, wherein the at least one pocket opening comprises at least one side opening adjacent to at least one of first and second edges of the front body panel.

3. The assembly of claim 1, wherein the at least one pocket opening comprises at least one top opening adjacent to a top edge of the pocket section.

4. The assembly of claim 1, wherein the at least one pocket opening comprises at least one bottom opening adjacent to a top edge of the blanket section.

5. The assembly of claim 1, further comprising the forced air warming blanket removably positioned within the pocket section.

6. The assembly of claim 5, wherein the forced air warming blanket comprises at least one of an upper body blanket, a lower body blanket, and underbody blanket, a full body blanket, a torso blanket, and a surgical access blanket.

7. The assembly of claim 1, further comprising a perimeter seal that seals the outer layer, the insulated layer, and the film layer of the insulated sheet to the permeable sheet along at least a portion of a top edge of the pocket section and along at least a portion of a bottom edge of the front body panel, and that seals the insulated layer to the outer layer and the film layer along first and second edges of the front body panel, along at least a portion of the top edge of the pocket section, and along at least a portion of a bottom edge of the front body panel.

8. The assembly of claim 1, wherein at least one of a first and a second side edge of the permeable sheet are spaced inwardly from at least one of a first and a second side edge of the insulated sheet, respectively.

9. The assembly of claim 1, wherein the insulated sheet has a first width and the permeable sheet has a second width that is less than the first width.

10. The assembly of claim 1, wherein patient warming is provided by convection through the permeable sheet.

11. The assembly of claim 1, wherein the permeable sheet comprises an impermeable material through which a plurality of perforations are defined.

12. A method, comprising:
providing an insulated sheet comprising an outer layer, a film layer, and an insulated layer positioned between the outer layer and the film layer;
providing a permeable sheet;
positioning the film layer of the insulated sheet adjacent to the permeable sheet;
sealing the insulated sheet and the permeable sheet together to define:
  a pocket section defining at least one pocket opening; and
  a blanket section that includes an inflatable air space between the permeable sheet and the insulated sheet to receive warmed air for warming a patient.

13. A front body panel, comprising:
a first edge attachable to a first portion of a clinical garment;
an opposite second edge attachable to a second portion of the clinical garment;
an insulated sheet comprising an outer layer, a film layer, and an insulated layer positioned between the outer layer and the film layer; and
a permeable sheet positioned adjacent to the film layer of the insulated sheet to define a cavity therebetween;
wherein the insulated sheet and the permeable sheet are sealed together to define:
  a pocket section defining at least one pocket opening; and
  a blanket section providing at least one inlet port in fluidic communication with the cavity, wherein the blanket section is configured to provide warming to a patient based on the cavity receiving warmed air via the at least one inlet port.

14. The front body panel of claim 13, wherein the blanket section is below the pocket section.

15. The front body panel of claim 13, wherein the blanket section is above the pocket section.

16. The assembly of claim 1, further comprising the accessory, and wherein the accessory comprises a forced air warming blanket.

17. The front body panel of claim 13, further comprising a forced air warming blanket removably positioned within the pocket section.

18. The front body panel of claim 13, wherein the permeable sheet defines a plurality of apertures in fluidic communication with the cavity, and wherein the blanket section is configured to provide the warmed air to the patient via the apertures.

* * * * *